(12) United States Patent
Takada et al.

(10) Patent No.: US 8,268,497 B2
(45) Date of Patent: Sep. 18, 2012

(54) FUEL CELL WITH FUEL-STOICHIOMETRIC RATIO CONTROL PORTION

(75) Inventors: Masahiro Takada, Shizuoka (JP); Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 1133 days.

(21) Appl. No.: 12/137,951

(22) Filed: Jun. 12, 2008

(65) Prior Publication Data
US 2008/0311452 A1  Dec. 18, 2008

(30) Foreign Application Priority Data

Jun. 12, 2007 (JP) ................... 2007-155608
May 26, 2008 (JP) ................... 2008-136265

(51) Int. Cl.
*H01M 8/04* (2006.01)
(52) U.S. Cl. ......... 429/432; 429/431; 429/444; 429/428
(58) Field of Classification Search .......... None
See application file for complete search history.

(56) References Cited

U.S. PATENT DOCUMENTS

| 6,590,370 B1 | 7/2003 | Leach | |
| 2007/0212579 A1 * | 9/2007 | Takada et al. | 429/22 |

FOREIGN PATENT DOCUMENTS

| JP | 2002164068 A | * | 6/2002 |
| JP | 2006-501798 T | | 1/2006 |
| JP | 2006-073379 | | 3/2006 |

* cited by examiner

*Primary Examiner* — Keith Walker
(74) *Attorney, Agent, or Firm* — McDermott Will & Emery LLP (57) ABSTRACT

A fuel cell system includes: a fuel cell stack including a plurality of fuel cells connected in series; a fuel supply portion supplying a fuel to each fuel cell; a current regulation portion regulating an electric current flowing from the fuel cell stack in such a way that an output voltage of the fuel cell stack is a predetermined set voltage; a voltage detection portion detecting an output voltage of each fuel cell; a fuel-supply control portion regulating a fuel supply to each fuel cell by the fuel supply portion in such a way that the difference decreases between an output voltage of each fuel cell detected by the voltage detection portion; a fuel-stoichiometric ratio detection portion detecting a fuel stoichiometric ratio of the fuel cell stack; and a fuel-stoichiometric ratio control portion regulating the set voltage in such a way that a fuel stoichiometric ratio detected by the fuel-stoichiometric ratio detection portion is a target fuel stoichiometric ratio set in advance.

11 Claims, 7 Drawing Sheets

FUEL CELL WITH FUEL-STOICHIOMETRIC RATIO CONTROL PORTION

BACKGROUND OF THE INVENTION

1. Field of the Invention

The present invention relates to a fuel cell system suitable as a power source for an electronic apparatus or the like.

2. Description of the Background Art

In recent years, a great deal of attention has been paid to a fuel cell system as a power source for an electronic apparatus or the like capable of supplying electric power continuously for a long time. A fuel cell system is generally configured by an electrolyte layer, and an anode and a cathode sandwiching the electrolyte layer. It generates a direct current through an electrochemical reaction by supplying the anode with hydrogen and the cathode with oxygen. A fuel cell as a minimum unit generating such an electric current has a low electromotive voltage, thus requiring a series connection of a plurality of fuel cells to thereby obtain a voltage necessary for a fuel cell power apparatus. Hence, several fuel cells stacked and connected in series make up a fuel cell stack generating a higher output voltage and greater power.

A fuel cell system can produce a larger amount of electric current by enlarging the reaction area of an electrode. However, this enlargement makes the fuel cell system larger, thus unsuitable for a fuel cell system used in a portable electronic apparatus or the like requiring a smaller size. Therefore, in order to realize an active reaction on a massive scale in a limited reaction area, operation control is needed such as feeding a fuel smoothly to each fuel cell according to a target power for a load apparatus.

For the operation control, a method is known of supplying electric power to a load while storing the power generated by a fuel cell system in a secondary battery and regulates an input voltage or an input current into a DC/DC converter from a fuel cell based on feedback from the fuel cell (e.g., refer to Published Japanese Translation for PCT International Publication No. 2006-501798).

The above several fuel cells connected in series may differ in the output voltage of each fuel cell due to their characteristic dispersion when the supply of fuel to each fuel cell is uniform, and all the series-connected fuel cells have the same output current in the fuel cell stack including the series-connected fuel cells. If too much electric current flows through a fuel cell having a lower fuel stoichiometric ratio (=(supplied-fuel consuming rate)/(power-generating fuel consuming rate)) and a lower output voltage, the terminal voltage of the cell lower than any other cell is reversely polarized to the output voltage of the whole fuel cell stack, in other words, it becomes minus, called a fuel cell polarity reversal. This causes the problem of deteriorating the characteristics of a fuel cell.

Taking the problem into account, a method is known of controlling the supply of fuel or air to each fuel cell individually in a plurality of fuel cells connected in series to thereby reduce the output-voltage dispersion of each fuel cell (e.g., refer to Japanese Patent Laid-Open Publication No. 2006-73379).

Furthermore, a fuel-supply margin for a generated current becomes constant by keeping a fuel stoichiometric ratio (=supplied-fuel consuming rate/power-generating fuel consuming rate) constant. This makes it possible to control the fuel stoichiometric ratio constant at an appropriate value to thereby stabilize an output electric power. In addition to an output electric power, a power-generation efficiency which is the product of a voltage efficiency and a fuel utilization, is a crucial index for the performance of a power-generation portion of a fuel cell. The voltage efficiency is expressed by (fuel cell generated voltage/theoretical voltage), and the theoretical voltage is 1.21 V in a direct-methanol fuel cell. The fuel utilization is expressed by (power-generating fuel quantity/consumed fuel quantity).

A type of fuel cell supplying a water-soluble fuel and a solution thereof to an electrode, mainly including a direct-methanol fuel cell, has a so-called methanol-crossover problem of consuming a fuel (e.g., methanol) without generating energy by passing an electrolyte film supposed to isolate an anode from a cathode, thereby keeping a fuel utilization thereof commonly at 70 to 80%. This requires a fuel cell operation at an optimum fuel stoichiometric ratio to thereby maximize the output electric power and power-generation efficiency.

In view of fuel-supply and power-generation stability, therefore, it is desirable to generate power by operating a fuel cell system while controlling the fuel stoichiometric ratio constant. Accordingly, each fuel cell is generally supplied with a fixed quantity of fuel at a fixed concentration to thereby generate power at a constant current. For example, Published Japanese Translation for PCT International Publication No. 2006-501798 mentions a method of generating power at a constant current or a constant voltage in a fuel cell, controlling an operation point for power generation and charging a secondary battery with the power.

According to the art of Published Japanese Translation for PCT International Publication No. 2006-501798, however, when the fuel cell stack including the several series-connected fuel cells generates power at a constant current, the characteristic dispersion of each fuel cell disperses the output voltage of each fuel cell, though the generated current of each fuel cell is the same. Particularly, it is known that the lower the fuel stoichiometric ratio becomes to enhance the fuel utilization efficiency, the more easily the output voltage of each fuel cell disperses. Besides, if the cathode of a fuel cell produces flooding, the output voltage of the fuel cell may suddenly drop, thereby causing a polarity reversal to degrade the fuel cell.

On the other hand, in the art of Japanese Patent Laid-Open Publication No. 2006-73379, if the flow rate of a fuel supplied to each cell varies according to the output voltage of each fuel cell for the purpose of preventing the output voltage of each fuel cell from dispersing, then the fuel supply cannot be kept constant. The fuel-supply variation changes the fuel stoichiometric ratio, thereby making it hard to control the fuel stoichiometric ratio constant.

Accordingly, the arts of Published Japanese Translation for PCT International Publication No. 2006-501798 and Japanese Patent Laid-Open Publication No. 2006-73379 have the problem of making harder in reducing the dispersion of the output voltage of each fuel cell in the fuel cell stack including the several series-connected fuel cells and simultaneously in generating power while keeping a fuel stoichiometric ratio constant.

SUMMARY OF THE INVENTION

In view of the problems of the prior arts, it is an object of the present invention to provide a fuel cell system capable of decreasing the dispersion of the output voltage of each fuel cell in a fuel cell stack made up of a plurality of fuel cells connected in series and generating power while controlling a fuel stoichiometric ratio constant.

A fuel cell system according to an aspect of the present invention comprises: a fuel cell stack including a plurality of fuel cells connected in series; a fuel supply portion supplying a fuel to each fuel cell; a current regulation portion regulating an electric current flowing from the fuel cell stack in such a way that an output voltage of the fuel cell stack is a predetermined set voltage; a voltage detection portion detecting an output voltage of each fuel cell; a fuel-supply control portion regulating a fuel supply to each fuel cell by the fuel supply portion in such a way that the difference decreases between an output voltage of each fuel cell detected by the voltage detection portion; a fuel-stoichiometric ratio detection portion detecting a fuel stoichiometric ratio of the fuel cell stack; and a fuel-stoichiometric ratio control portion regulating the set voltage in such a way that a fuel stoichiometric ratio detected by the fuel-stoichiometric ratio detection portion is a target fuel stoichiometric ratio set in advance.

According to this configuration, the fuel-supply control portion regulates a fuel supply to each fuel cell by the fuel supply portion in such a way that the difference decreases between an output voltage of each fuel cell detected by the voltage detection portion, thereby reducing the dispersion of the output voltage of each fuel cell. Besides, the fuel-stoichiometric ratio control portion regulates the set voltage in such a way that a fuel stoichiometric ratio detected by the fuel-stoichiometric ratio detection portion is a target fuel stoichiometric ratio set in advance. In addition, the current regulation portion regulates an electric current flowing from the fuel cell stack in such a way that an output voltage of the fuel cell stack is a set voltage set by the fuel-stoichiometric ratio control portion. Since the fuel stoichiometric ratio of the fuel cell stack varies according to the output voltage, the output voltage of the fuel cell stack becomes the set voltage to thereby bring the fuel stoichiometric ratio of the fuel cell stack to the fixed target fuel stoichiometric ratio and thus control the fuel stoichiometric ratio constant. This is different from the prior arts where a fuel cell generates power at a constant current or at a constant voltage to thereby keep a fuel stoichiometric ratio constant. The set voltage are varied, in other words, the output current and output voltage of the fuel cell stack are varied to thereby bring the fuel stoichiometric ratio to the target fuel stoichiometric ratio and keep it constant. This makes it easier to reduce the dispersion of the output voltage of each fuel cell in the fuel cell stack, and at the same time, generate power while keeping the fuel stoichiometric ratio constant.

DESCRIPTION OF THE PREFERRED EMBODIMENT

Figure 1:
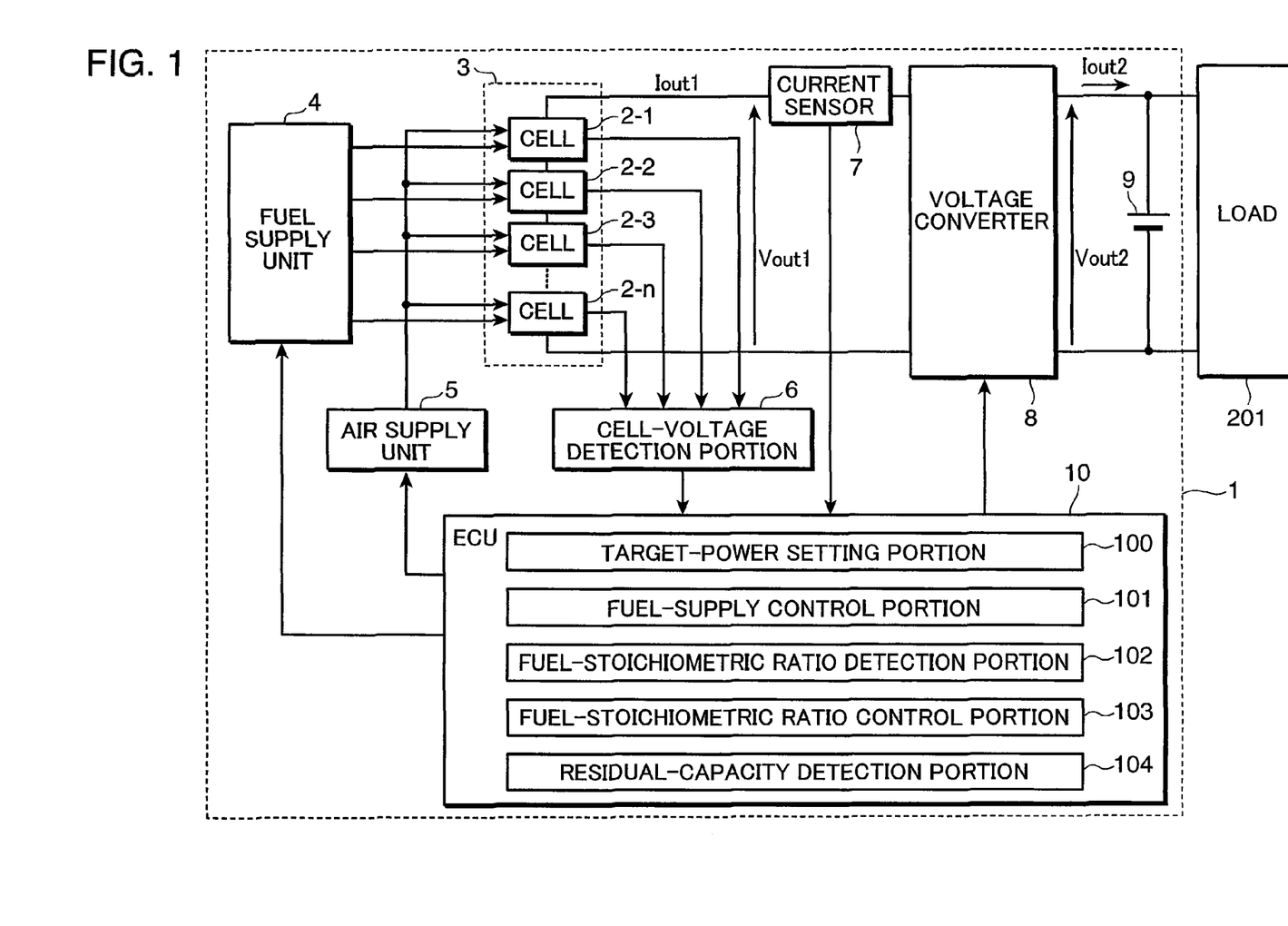
FIG. 1 is a block diagram showing an example of the configuration of a fuel cell system according to an embodiment of the present invention.

An embodiment of the present invention will be below described with reference to the drawings. In each figure, component elements are given the same reference characters and numerals, as long as they are identical to one another. Thus, their description is omitted. FIG. 1 is a block diagram showing an example of the configuration of a fuel cell system according to the embodiment of the present invention.

A fuel cell system 1 shown in FIG. 1 is configured by: a fuel cell stack 3 made up of n cells (fuel cells) 2-1, 2-2, 2-3, ..., 2-n connected in series; a fuel supply unit 4 (the fuel supply portion); an air supply unit 5; a cell-voltage detection portion 6 (the voltage detection portion); a current sensor 7 (the current detection portion); a voltage converter 8 (the current regulation portion); a secondary battery 9 (the storage device); and an ECU (electric control unit) 10. The cells 2-1, 2-2, 2-3, ..., 2-n are below denoted by the reference numeral without any appendix when generically mentioned while with an appendix when individually indicated.

As the cell 2, various fuel cells can be employed, such as an active DMFC (direct methanol fuel cell), a passive DMFC, DDFC (direct DME fuel cell) and an RMFC (reformed methanol fuel cell). The fuel cell stack 3 is made up of the n cells 2 connected in series. The cell 2 is fed with a fuel of, for example, hydrogen, methanol or the like.

The cell 2 has such characteristics that an output voltage drops as a load current increases while the output voltage rises as the load current decreases, as well as a fuel stoichiometric ratio (=supplied-fuel consuming rate/power-generating fuel consuming rate) varies according to a power-generation output voltage in a constant fuel supply. Specifically, within a predetermined voltage range, the lower output voltage the cell 2 has, the higher the fuel stoichiometric ratio becomes, while the higher output voltage the cell 2 has, the lower the fuel stoichiometric ratio becomes. In the fuel cell stack 3, therefore, an output voltage Vout1 drops as an output current Iout1 increases, and on the other hand, the output voltage Vout1 rises as the output current Iout1 decreases. Besides, in the fuel cell stack 3, the fuel stoichiometric ratio goes up as the output voltage Vout1 lowers while the fuel stoichiometric ratio goes down as the output voltage Vout1 heightens within a predetermined voltage range.

The fuel supply unit 4 is formed, for example, by a fuel pump and supplies a fuel stored in a fuel tank (not shown), for example, methanol to each anode of the cells 2-1 to 2-n according to a control signal from the ECU 10. The air supply unit 5 is formed, for example, by a fuel pump and supplies air to each cathode of the cells 2-1 to 2-n according to a control signal from the ECU 10.

The cell-voltage detection portion 6 is formed, for example, by an analog-digital converter and the like. It detects each output voltage of the cells 2-1 to 2-n, converts each voltage into a digital value and outputs it to the ECU 10. The current sensor 7 is formed, for example, by a shunt resistor, a Hall element, an analog-digital converter and the like. It detects an electric current outputted from the fuel cell stack 3, in other words, the series circuit of the cells 2-1 to 2-n, converts the current value into a digital value and outputs it to the ECU 10.

The voltage converter 8 is, for example, a DC-DC converter circuit formed by a switching power-source circuit. It executes control in such a way that the output voltage Vout1 of the fuel cell stack 3 comes to a set voltage Vs corresponding to a control signal from the ECU 10, for example, by changing the on-off duty or on-off frequency of a switching circuit to regulate an electric current extracted (sent) into the voltage converter 8 from the fuel cell stack 3 which is the output current Iout1.

The voltage converter 8 is not limited to obtaining the set voltage Vs from the ECU 10 and regulating the output current Iout1 in such a way that the output voltage Vout1 becomes the set voltage Vs. For example, it may adjust the output voltage Vout1 of the fuel cell stack 3 to the set voltage Vs by allowing the ECU 10 to monitor the output voltage Vout1 acquired by the cell-voltage detection portion 6 and lowering the output voltage Vout1 by increasing the electric current extracted by the voltage converter 8 if the output voltage Vout1 is above the set voltage Vs while heightening the output voltage Vout1 by decreasing the electric current extracted by the voltage converter 8 if the output voltage Vout1 is below the set voltage Vs while.

Furthermore, the voltage converter 8 supplies generated power (=Vout1×Iout1) of the fuel cell stack 3 to the secondary battery 9. An output voltage Vout2 is determined, for example, by a terminal voltage of the secondary battery 9 (Vout2 is determined not by the voltage converter 8 itself but by the secondary battery 9). With the output voltage Vout2, an output voltage of the secondary battery 9 is supplied to an external load 201, in other words, the output voltage Vout2 of the voltage converter 8 is supplied to the circuit of the secondary battery 9 and the load 201 connected in parallel. As a result, the power generated by the fuel cell stack 3 is supplied via the voltage converter 8 to the secondary battery 9 and the load 201.

As the secondary battery 9, various secondary batteries can be employed, such as a lithium-ion secondary battery and a nickel-hydrogen secondary battery. The secondary battery 9 may be replaced as the storage device, for example, with a capacitor having a large capacity such as an electric double-layer capacitor.

The ECU 10 is formed, for example, by a CPU (central processing unit) executing a predetermined arithmetic processing, a ROM (read only memory) having a predetermined control program in storage, a RAM (random access memory) storing data temporarily, a peripheral circuit thereof and the like. It functions as a target-power setting portion 100, a fuel-supply control portion 101, a fuel-stoichiometric ratio detection portion 102, a fuel-stoichiometric ratio control portion 103 and a residual-capacity detection portion 104 by executing the control program stored in the ROM.

The target-power setting portion 100 increases a target power Pt equivalent to a target value of the power generated by the fuel cell stack 3 beyond consumed power of the load 201 if a residual capacity of the secondary battery 9 detected by the residual-capacity detection portion 104 does not reach a reference capacity set in advance. On the other hand, it decreases the target power Pt under the consumed power of the load 201 if a residual capacity of the secondary battery 9 detected by the residual-capacity detection portion 104 exceeds the reference capacity.

The fuel-supply control portion 101 regulates a fuel supply to the cells 2-1 to 2-n by the fuel supply unit 4 so as to decrease the difference between each output voltage of the cells 2-1 to 2-n detected by the cell-voltage detection portion 6, in other words, the dispersion of each output voltage. In addition, it allows the air supply unit 5 to supply the cells 2-1 to 2-n with air in the volume corresponding to a fuel supply to the cells 2-1 to 2-n.

The fuel-supply control portion 101 calculates a generated power Ps of the fuel cell stack 3, for example, by multiplying the output voltage Vout1 and the output current Iout1 together. It may calculate the output voltage Vout1, for example, by summing up each output voltage of the cells 2-1 to 2-n detected by the cell-voltage detection portion 6. Alternatively, the cell-voltage detection portion 6 may detect the output voltage Vout1.

Furthermore, if the generated power Ps of the fuel cell stack 3 is below the target power Pt set in advance, the fuel-supply control portion 101 allows the fuel supply unit 4 to increase a total fuel flow rate R (the total fuel supply) equivalent to the total quantity of a fuel supplied to the fuel cell stack 3. On the other hand, if the generated power Ps of the fuel cell stack 3 is above the target power Pt, it allows the fuel supply unit 4 to decrease the total fuel flow rate R. In this case, the fuel-supply control portion 101 allows the fuel supply unit 4, for example, to evenly increase and decrease the fuel supply to the cells 2-1 to 2-n to thereby vary the total fuel flow rate R.

The fuel-stoichiometric ratio detection portion 102 calculates a fuel stoichiometric ratio of the fuel cell stack 3. Specifically, it calculates a current value I by averaging the output current Iout1 detected by the current sensor 7 for a predetermined second set time, for example, for a minute. The fuel-stoichiometric ratio detection portion 102 calculates a fuel stoichiometric ratio S of the fuel cell stack 3 using the thus obtained current value I (A) in the following expression (2).

$$\text{Fuel stoichiometric ratio } S = \{n \times M \times R \times F/(60 \times 10^3)\}/I \quad (2)$$

n: charge number of a fuel oxidization reaction
M: fuel concentration (mol/L)
R: fuel average value (cc/min) supplied to each cell 2 and
F: Faraday constant (=96485 C/mol).

Herein, $\{n \times M \times R \times F/(60 \times 10^3)\}$ indicates a reduced current value It equivalent to a fuel quantity supplied to the fuel cell stack 3 when the fuel quantity is all consumed for power generation, the fuel stoichiometric ratio S is obtained by dividing the reduced current value It of the fuel supply by the current value I, thereby establishing the following expression (3).

$$\text{Fuel-supply reduced current value } It = n \times M \times R \times F/(60 \times 10^3) \quad (A) \quad (3)$$

If the fuel is methanol, for example, a reaction formula in an anode of the cell 2 is expressed by the following expression (4).

Anode Reaction Formula $$CH_3OH + H_2O \rightarrow CO_2 + 6H^+ + 6e^- \quad (4)$$

One methanol molecule releases six electrons, thereby the charge number n=6.

The fuel-stoichiometric ratio control portion 103 regulates the set voltage Vs for the voltage converter 8 in such a way that the fuel stoichiometric ratio S calculated by the fuel-stoichiometric ratio detection portion 102 comes to a target fuel stoichiometric ratio St set in advance. The target fuel stoichiometric ratio St is set to approximately 1.4, for example, experimentally obtained, thereby maximizing the generated power regardless of the fuel flow rate.

Figure 3:
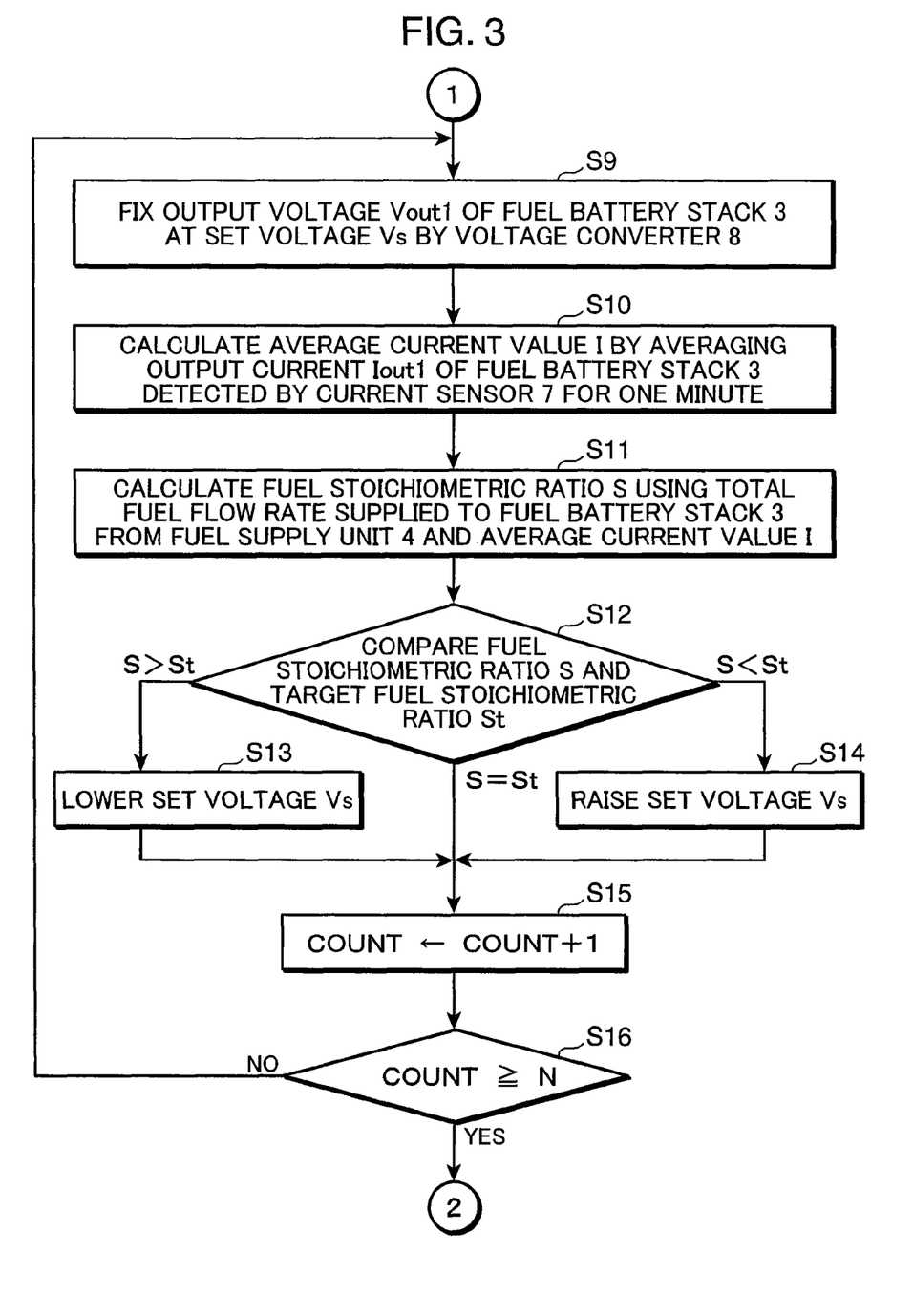
FIG. 3 is a flow chart showing an example of the operation of the fuel cell system of FIG. 1.

The inventors studied an optimum value of the target fuel stoichiometric ratio St. As shown in FIG. 3 of Japanese Patent Laid-Open Publication No. 2006-73379 described earlier, generated power of a fuel cell becomes greater as a fuel supply increases within a monotonic increase range. This is because as the fuel flow rate is raised while keeping a generated current constant, an electrode-reaction concentration overvoltage gradually drops to thereby heighten a generated voltage.

Taking the "(fuel stoichiometric ratio)=(supplied-fuel consuming rate)/(power-generating fuel consuming rate)" into account, an increase in the fuel flow rate means a rise in the fuel stoichiometric ratio to thereby height the generated voltage and increase the output power as the fuel stoichiometric ratio is raised.

In addition, it is essential to improve a power-generation efficiency as another power-generation performance element to thereby enhance an actual fuel energy density. Hence, the inventors examined a relationship between a fuel stoichiometric ratio and a power-generation efficiency. The power-generation efficiency is the product of a voltage efficiency and a fuel utilization, and as described above, the voltage efficiency goes up as the fuel stoichiometric ratio rises and is expressed by the ratio of a generated voltage to a theoretical voltage of 1.21V in a direct-methanol fuel cell. Therefore, the power-generation efficiency becomes higher as the fuel stoichiometric ratio rises within the monotonic increase range shown in FIG. 3 of Japanese Patent Laid-Open Publication No. 2006-73379.

On the other hand, the rise in the fuel stoichiometric ratio increases a methanol-crossover quantity monotonously, and simultaneously, monotonously lowers the fuel utilization equivalent to the "(power-generating fuel quantity)/(consumed fuel quantity)". The inventors found out that the power-generation efficiency reaches the highest value at a fuel-stoichiometric ratio value of 1.4 by considering the power-generation efficiency as the product of the voltage efficiency and the fuel utilization to be the function of the fuel stoichiometric ratio.

At this time, the fuel utilization is 76%. If the output current of the fuel cell stack 3 is I and a reduced current value equivalent to a current value to be obtained suppose a fuel quantity lost as a methanol crossover is utilized for power generation is Ix, then a fuel utilization $\eta=I/(I+Ix)$. In consideration of a breakdown of the fuel utilization $\eta$ in the case of a fuel-stoichiometric ratio value of 1.4, Ix is 0.25 if I is 1.0, thereby meaning discharging 1.4−1.0−0.25=0.15 of a fuel supply of 1.4 from an electrode without being involved in power generation nor crossover.

As a result of diligent study, the inventors found out that discharging an appropriate quantity of fuel from an electrode without being involved in power generation nor crossover is a condition for realizing both high power and high efficiency. If a reduced current value equivalent to an electric current to be obtained suppose the fuel quantity discharged from an electrode without being involved in power generation nor crossover reacts is $I_E$ and the ratio of $I_E$ to the generated current I or ($I_E/I$) is E, then a reduced current value $I_F$ equivalent to an electric current to be obtained suppose a fuel quantity supplied to an electrode reacts is expressed in the following expression (5). Herein, E is a stoichiometric number for an electric current according to a discharged-fuel quantity from an electrode of each fuel cell, thus indicating the ratio of the reduced current value $I_E$ of a fuel discharged without reacting from each electrode to the generated current I.

$$I_F = I + Ix + I_E \quad (5)$$

Hence, the fuel stoichiometric ratio S is expressed in the following expression (6).

$$S = I_F/I = (I + Ix + I_E)/I = (1/\eta) + E \quad (6)$$

The inventors found out that the target fuel stoichiometric ratio St for maximizing the power-generation efficiency is realized if E in the expression (6) is within a range of 0.01 to 0.2.

Figure 7:
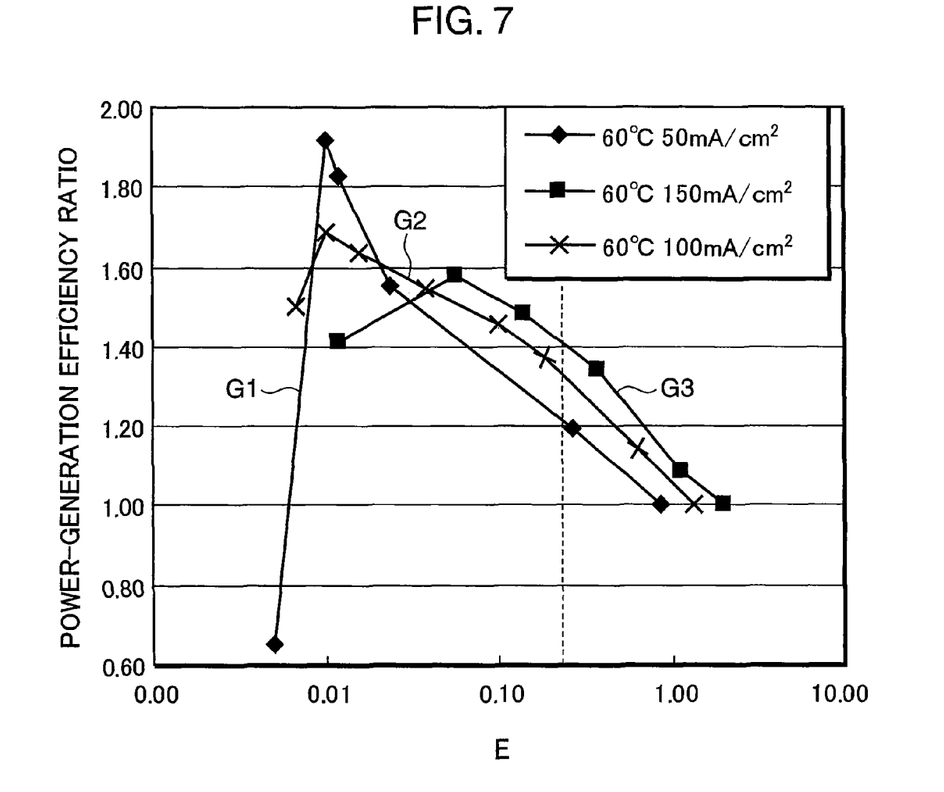
FIG. 7 is a graphical representation showing an example of the relationship between a stoichiometric number E for an electric current according to a discharged-fuel quantity from an electrode of a fuel cell and a power-generation efficiency.

FIG. 7 shows a relationship between E and a power-generation efficiency, where the horizontal axis indicates "E" in the expression (6) and the vertical axis indicates a power-generation efficiency ratio equivalent to the ratio of a power-generation efficiency to a predetermined power-generation efficiency. A graph G1 shows a case where a current density flowing per area through an electrode of a fuel cell is 50 mA/cm$^2$; a graph G2, 100 mA/cm$^2$; and a graph G3, 150 mA/cm$^2$.

As can be seen from the graphs G1 to G3, the power-generation efficiency ratio exceeds 1.2 meaning a high power-generation efficiency if E is within a range of 0.01 to 0.2 in all the cases of the current density 50 to 150 mA/cm$^2$.

The fuel utilization $\eta$ of an existing fuel cell stack is thought at least 0.6, and the fuel utilization $\eta$ will infinitely approximate one as future technological development minimizes a methanol-crossover quantity. Taking this into account, $\eta$ comes into a range of 0.6 to 1.0, thereby based on the expression (6), setting the target fuel stoichiometric ratio St appropriately to a range of 1.01 to 1.6.

The residual-capacity detection portion 104 detects a residual capacity of the secondary battery 9. Specifically, for example, if a storage device whose output voltage varies significantly as the residual capacity changes, such as a lithium-ion secondary battery and a capacitor, is employed as the secondary battery 9, then the residual-capacity detection portion 104 may detect a residual capacity based on the output voltage of the secondary battery 9. Alternatively, the residual-capacity detection portion 104 may integrate a charge-and-discharge current of the secondary battery 9 detected by a current sensor to thereby calculate a residual capacity of the secondary battery 9.

Figure 2:
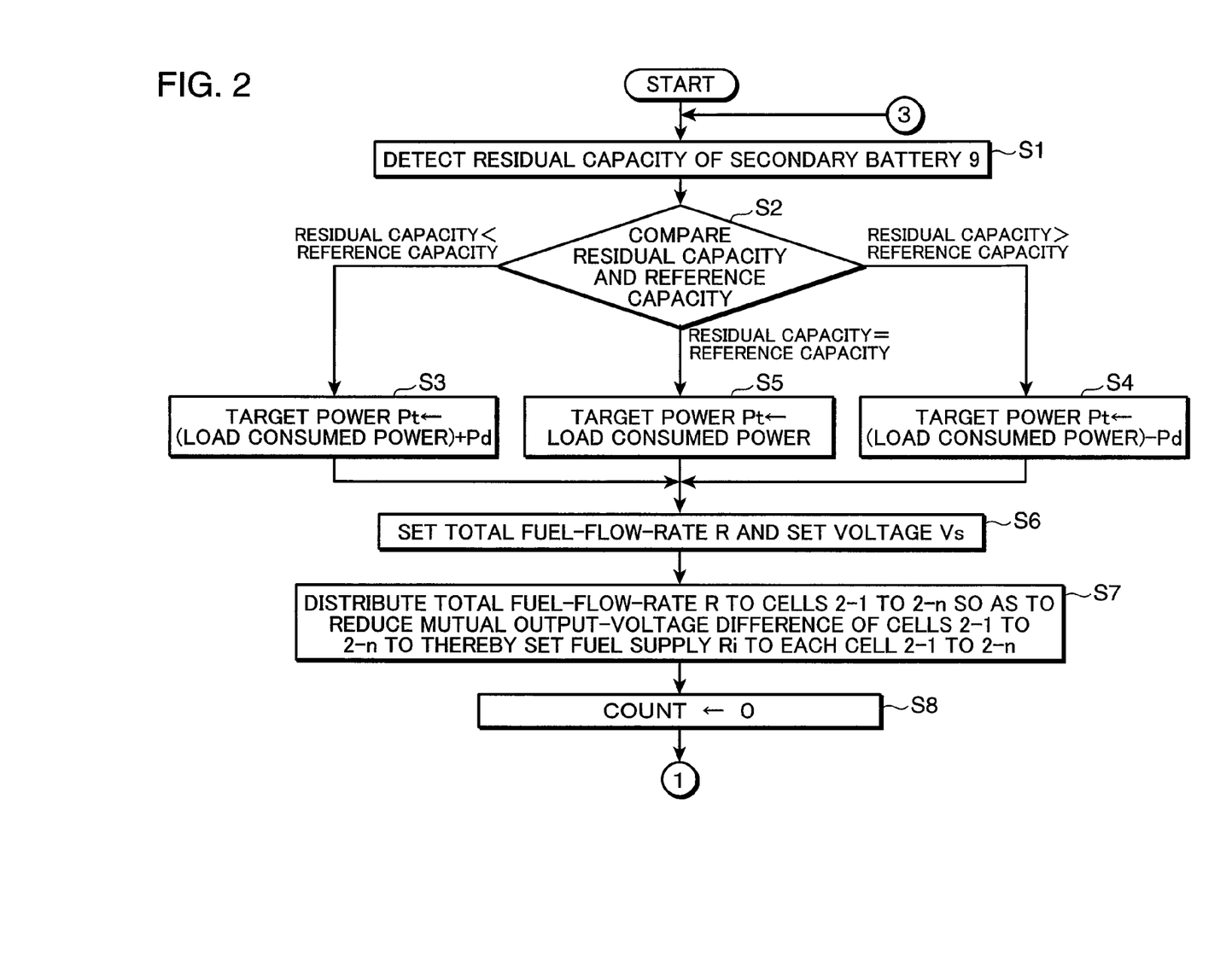
FIG. 2 is a flow chart showing an example of the operation of the fuel cell system of FIG. 1.
Figure 4:
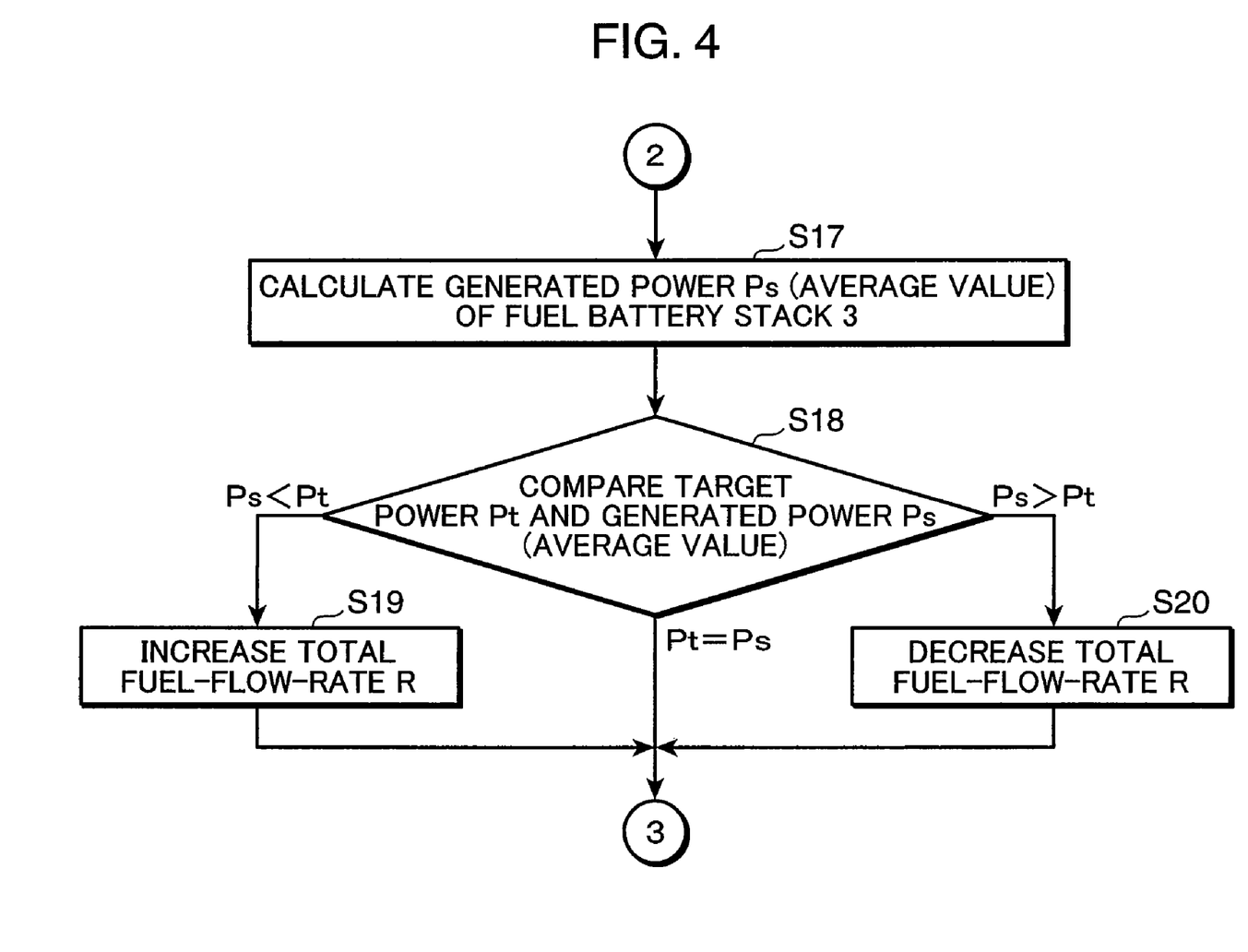
FIG. 4 is a flow chart showing an example of the operation of the fuel cell system of FIG. 1.

Next, an operation will be described of the fuel cell system 1 having the above configuration. FIGS. 2, 3 and 4 are a flow chart showing an example of the operation of the fuel cell system 1. First, the residual-capacity detection portion 104 detects a residual capacity of the secondary battery 9 (step S1). Then, the target-power setting portion 100 compares the residual capacity of the secondary battery 9 detected by the residual-capacity detection portion 104 and a reference capacity set in advance (step S2). The reference capacity is set, for example, to approximately 80% of a full charge capacity of the secondary battery 9.

If consumed power of the load 201 is above electric power supplied from the voltage converter 8 or generated power of the fuel cell stack 3, the secondary battery 9 discharges to thereby send the power in short supply to the load 201. In contrast, if the consumed power of the load 201 is below the power supplied from the voltage converter 8 or the generated power of the fuel cell stack 3, the excessive power charges the secondary battery 9 discharges to thereby send the power in short supply to the load 201. In this manner, the secondary battery 9 absorbs variations in consumed power of the load 201.

However, the secondary battery 9 cannot supply enough power if consumed power of the load 201 increases when the residual capacity of the secondary battery 9 is at a low level. On the other hand, if consumed power of the load 201 is reduced to produce excessive power in a nearly full charge state where the secondary battery 9 contains a great residual capacity, the excessive power may overcharge and degrade the secondary battery 9. Taking this into account, the reference capacity is preset to a residual capacity for enabling the secondary battery 9 to supply short power and be charged with excessive power.

If a residual capacity of the secondary battery 9 is below the reference capacity (residual capacity<reference capacity at the step S2), the target-power setting portion 100 sets the target power Pt by adding a power value Pd to a load consumed power (step S3). On the other hand, if a residual capacity of the secondary battery 9 is above the reference capacity (residual capacity>reference capacity at the step S2), the target-power setting portion 100 sets the target power Pt by subtracting the power value Pd from a load consumed power (step S4). Further, if a residual capacity of the secondary battery 9 is equal to the reference capacity (residual capacity=reference capacity at the step S2), the target-power setting portion 100 sets the target power Pt to a load consumed power (step S4). The power value Pd is suitably set to a proper value for charging and discharging the secondary battery 9.

The load consumed power may be a previously-known consumed power of the load 201, and alternatively, it may be calculated using a value obtained by measuring a voltage and an electric current supplied to the load 201.

As described later, the generated power of the fuel cell stack 3 is controlled so as to be the target power Pt. In the processing of the steps S1 to S5, therefore, if a residual capacity of the secondary battery 9 is below the reference capacity, the target power Pt increases to raise generated energy of the fuel cell stack 3 beyond the load consumed power, thereby charging the secondary battery 9 with the excessive power. If a residual capacity of the secondary battery 9 is above the reference capacity, the target power Pt decreases to decrease generated energy of the fuel cell stack 3 under the load consumed power, thereby discharging the short power from the secondary battery 9. As a result, the residual capacity of the secondary battery 9 is set to a reference capacity suitable for absorb the variations in consumed power of the load 201.

Next, in a step S6, the fuel-supply control portion 101 sets the total fuel flow rate (the total fuel supply) R supplied to the fuel cell stack 3 from the fuel supply unit 4 and the set voltage Vs equivalent to a target value for the output voltage Vout1 of the fuel cell stack 3. The set voltage Vs is set, for example, to a voltage set beforehand as an initial value.

Figure 5:
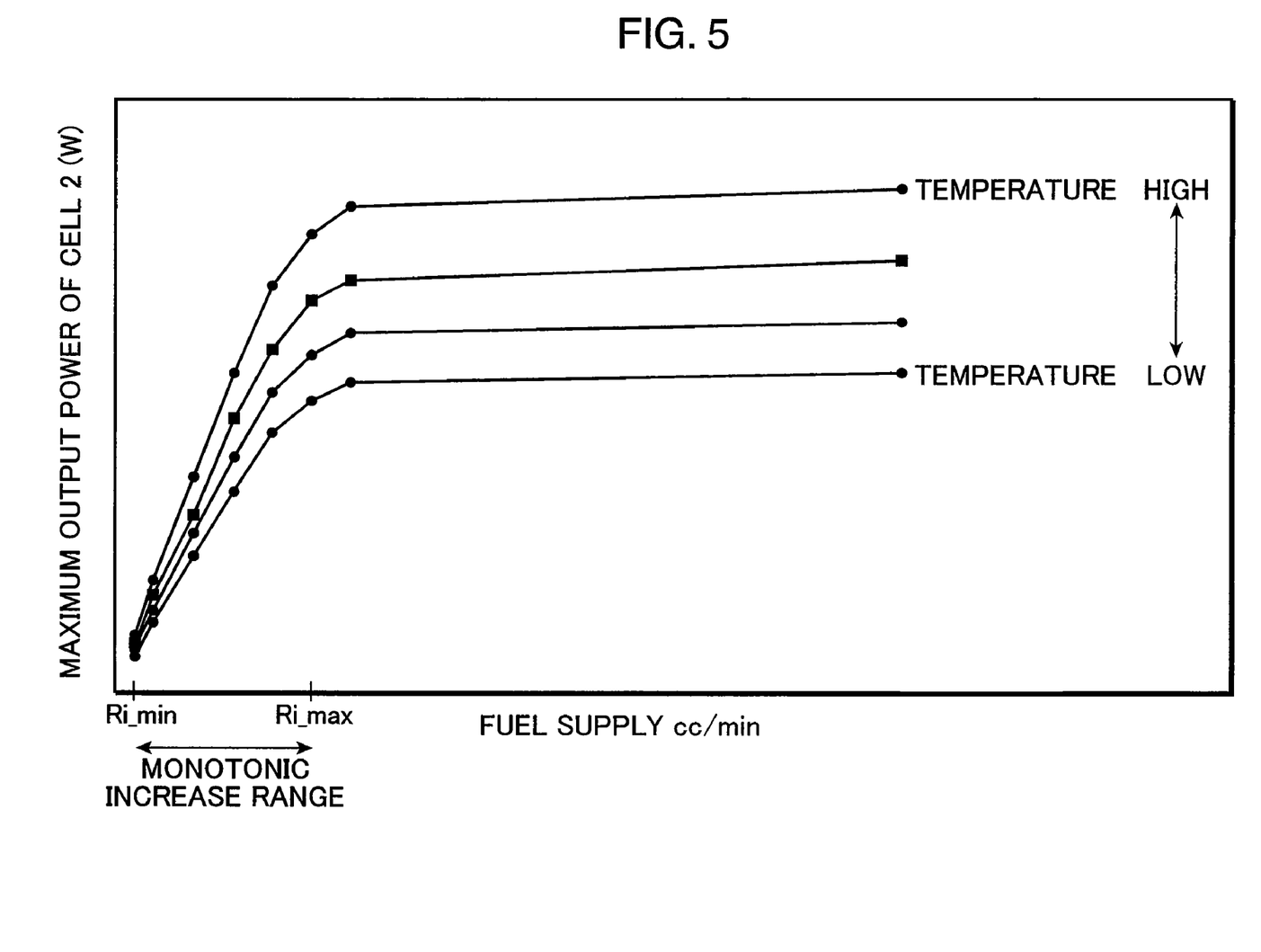
FIG. 5 is a graphical representation showing an example of the relationship between a fuel supply and a maximum output power of each cell shown in FIG. 1.

FIG. 5 is a graphical representation showing an example of the relationship between a per-piece fuel supply Ri and a maximum output power of the cell 2. As shown in FIG. 5, a range of Ri_min to Ri_max of the fuel supply Ri is a monotonic increase range where the fuel supply Ri is substantially proportional to the maximum output power. Hence, the generated power of the cell 2 can be regulated by controlling a fuel supply to the cell 2 in the monotonic increase range. Besides, as shown in FIG. 5, the generated energy of the cell 2 increases as the temperature rises while it decreases as the temperature falls.

Figure 6:
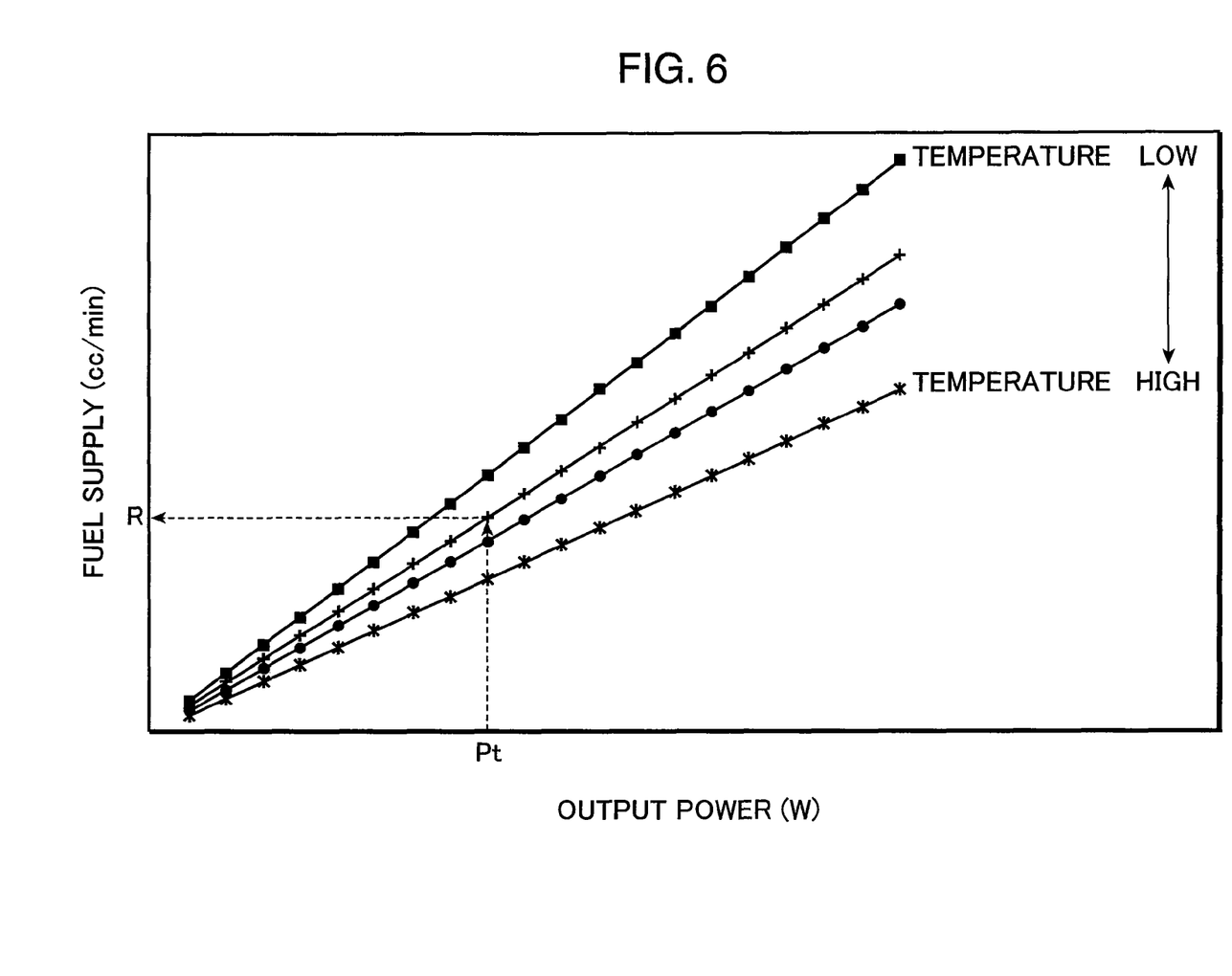
FIG. 6 is a graphical representation showing a relationship between a total fuel flow rate and an output power of a fuel cell stack made up of six cells in a monotonic increase range shown in FIG. 5.

FIG. 6 is a graphical representation showing a relationship between a total fuel flow rate and an output power of the fuel cell stack 3 made up of the six cells 2 or n=6 in the monotonic increase range. For example, the graphs of FIG. 6 are stored as a data table in a ROM of the ECU 10. In the step S6, the fuel-supply control portion 101 acquires the total fuel flow rate R corresponding to the target power Pt set by the target-power setting portion 100 with reference to the data table.

Next, the fuel-supply control portion 101 verifies each output voltage of the cells 2-1 to 2-n detected by the cell-voltage detection portion 6. Then, the fuel-supply control portion 101 distributes the total fuel flow rate R to the cells 2-1 to 2-n so as to decrease the difference between each output voltage of the cells 2-1 to 2-n and sets the fuel supply Ri to be supplied to the cells 2-1 to 2-n in the fuel supply unit 4 (step S7).

Specifically, the fuel supply unit 4 supplies a fuel to the cells 2-1 to 2-n based on the fuel supply Ri set by the fuel-supply control portion 101, and the cell-voltage detection portion 6 detects a voltage generated by the cells 2-1 to 2-n. On the basis of the voltage detected by the cell-voltage detection portion 6, the fuel-supply control portion 101 increases the fuel supply Ri to a cell having a lower output voltage among the cells 2-1 to 2-n and decreases the fuel supply Ri to a cell having a higher output voltage, and sets the fuel supply Ri to the cells 2-1 to 2-n in such a way that the total of the fuel supply Ri to the cells 2-1 to 2-n becomes the total fuel flow rate R by the fuel supply unit 4.

This reduces the dispersion of an output voltage among the cells 2-1 to 2-n to thereby unify the output voltages of the cells 2-1 to 2-n.

Next, the fuel-stoichiometric ratio control portion 103 initializes a variable COUNT by substituting "0" for it (step S8) and makes a request to set the output voltage Vout1 of the fuel cell stack 3 to the set voltage Vs. Then, the voltage converter 8 regulates an electric current extracted from the fuel cell stack 3 (an electric current flowing into the voltage converter 8) or the output current Iout1 in such a way that the output voltage Vout1 of the fuel cell stack 3 becomes the set voltage Vs, thereby keeping the output voltage Vout1 of the fuel cell stack 3 constant at the set voltage Vs (step S9).

Specifically, the voltage converter 8 acquires the output voltage Vout1, for example, from a voltage detection circuit (not shown), lowers the output voltage Vout1 by increasing the electric current extracted from the fuel cell stack 3 if the output voltage Vout1 is higher than the set voltage Vs and heightens the output voltage Vout1 by decreasing the electric current extracted from the fuel cell stack 3 if the output voltage Vout1 is lower than the set voltage Vs, thereby adjusting the output voltage Vout1 of the fuel cell stack 3 to the set voltage Vs.

The voltage converter 8 raises the voltage of the fuel cell stack 3 to the output voltage Vout2 to supply it to the secondary battery 9 and the load 201.

Next, the fuel-stoichiometric ratio detection portion 102 calculates the current value I by averaging the output current Iout1 of the fuel cell stack 3 detected by the current sensor 7 for a predetermined second set time, for example, for a minute (step S10). Using the total fuel flow rate R set by the fuel-supply control portion 101 and the current value I, the fuel-stoichiometric ratio detection portion 102 calculates the fuel stoichiometric ratio S in the expression (2) described earlier (step S11).

In this case, the current value I is an average value for the second set time, thus meaning the fuel stoichiometric ratio S calculated in the expression (2) is an average value for the second set time. The second set time is longer than time taken to operate the cell 2 stably after an operational condition of the cell 2 varies, for example, time taken to operate the cell 2 stably after the cell 2 starts to generate power, time taken to operate the cell 2 stably after the fuel supply Ri to the cell 2 varies, time taken to operate the cell 2 stably after a variation in the set voltage Vs or the like changes the output current of the cell 2 equal to the output current Iout1 flowing into the voltage converter 8, or the like. Accordingly, a transient state until a stable operation from a variation in an operational condition of the cell 2 is less likely to reflect the fuel stoichiometric ratio S, thereby lowering the possibility that the thus transient fuel stoichiometric ratio S may give feedback to control of the fuel stoichiometric ratio S by the fuel-stoichio control portion 103 to result in a vibration of the fuel stoichiometric ratio S.

The present invention is not necessarily limited to adopting an average value of the output current Iout1 as the current value I, and the output current Iout1 as it is may be used as the current value I.

Next, the fuel-stoichiometric ratio control portion 103 compares the fuel stoichiometric ratio S and the target fuel stoichiometric ratio St (step S12). If the fuel stoichiometric ratio S is greater than the target fuel stoichiometric ratio St ("S>St" at the step S12), the fuel-stoichiometric ratio control portion 103 lowers the set voltage Vs of the voltage converter 8 (step S13) and the processing shifts to a step S15. Then, the voltage converter 8 increases an absorption current or the output current Iout1 of the fuel cell stack 3 to thereby drop the output voltage Vout1 to the set voltage Vs. The fall in the output voltage Vout1 reduces the fuel stoichiometric ratio S in the fuel cell stack 3, thereby bringing the fuel stoichiometric ratio S closer to the target fuel stoichiometric ratio St.

If the fuel stoichiometric ratio S is smaller than the target fuel stoichiometric ratio St ("S<St" at the step S12), the fuel-stoichiometric ratio control portion 103 raises the set voltage Vs of the voltage converter 8 (step S14) and the processing shifts to the step S15. Then, the voltage converter 8 decreases the absorption current or the output current Iout1 of the fuel cell stack 3 to thereby heighten the output voltage Vout1 to the set voltage Vs. The rise in the output voltage Vout1 raises the fuel stoichiometric ratio S in the fuel cell stack 3, thereby bringing the fuel stoichiometric ratio S closer to the target fuel stoichiometric ratio St.

If the fuel stoichiometric ratio S is equal to the target fuel stoichiometric ratio St ("S=St" at the step S12), the fuel-stoichiometric ratio control portion 103 does not vary the set voltage Vs of the voltage converter 8 and the processing shifts to the step S15.

In the step S15, the fuel-stoichiometric ratio control portion 103 adds "1" to the variable COUNT and compares a predetermined set number-of-times N and the variable COUNT (step S16). If the variable COUNT is below the set number-of-times N (NO at the step S16), the steps S9 to S16 are repeated again. The steps S9 to S16 are repeated N times to thereby converge the fuel stoichiometric ratio S upon the target fuel stoichiometric ratio St. The set number-of-times N is suitably set to a number-of-times fit for converging the fuel stoichiometric ratio S upon the target fuel stoichiometric ratio St according to the response characteristics of a control loop constituted by the voltage converter 8, the fuel cell stack 3, the fuel-stoichiometric ratio detection portion 102 and the fuel-stoichiometric ratio control portion 103.

If the variable COUNT reaches the set number-of-times N (YES at the step S16), the processing goes ahead to a step S17.

In the step S17, the fuel-supply control portion 101 calculates the generated power Ps (instantaneous value) of the fuel cell stack 3 by multiplying the output voltage Vout1 detected by the cell-voltage detection portion 6 by the output current Iout1 detected by the current sensor 7. It is desirable that the fuel-supply control portion 101 averages the thus obtained generated power Ps (instantaneous value) for a predetermined first set time and uses it as the generated power Ps (average value). The first set time is set, for example, to a time similar to the above second set time. Accordingly, a transient state until a stable operation from a variation in an operational condition of the cell 2 is less likely to reflect the generated power Ps (average value), thereby lowering the possibility that the thus transient generated power Ps (average value) may give feedback to control of the total fuel flow rate R by the fuel-supply control portion 101 to result in a vibration of the total fuel flow rate R.

Next, the fuel-supply control portion 101 compares the target power Pt and the generated power Ps (average value) (step S18). If the generated power Ps (average value) does not reach the target power Pt (Ps<Pt at the step S18), the fuel-supply control portion 101 increases the total fuel flow rate R (step S19). In the same way as the step S7, the fuel-supply control portion 101 distributes the increased total fuel flow rate R to the cells 2-1 to 2-$n$ so as to decrease the difference between each output voltage of the cells 2-1 to 2-$n$ and sets the fuel supply Ri to be supplied to the cells 2-1 to 2-$n$ in the fuel supply unit 4. The processing of the steps S1 to S20 is repeated again.

On the other hand, if the generated power Ps (average value) exceeds the target power Pt (Ps>Pt at the step S18), the fuel-supply control portion 101 decreases the total fuel flow rate R (step S20). In the same way as the step S7, the fuel-supply control portion 101 distributes the decreased total fuel flow rate R to the cells 2-1 to 2-$n$ so as to decrease the difference between each output voltage of the cells 2-1 to 2-$n$ and sets the fuel supply Ri to be supplied to the cells 2-1 to 2-$n$ in the fuel supply unit 4. The processing of the steps S1 to S20 is repeated again.

As described so far, electric power can be generated by reducing the dispersion of an output voltage of the cells 2-1 to 2-$n$ in the step S7, and simultaneously, allowing the fuel stoichiometric ratio S to coincide with the target fuel stoichiometric ratio St and controlling it constant in the processing of the steps S9 to S16. Further, in the processing of the steps S17 to S20, the generated power Ps of the fuel cell stack 3 turns to the target power Pt set in the steps S1 to S4, thereby making it possible to bring the charge level of the secondary battery 9 to the above reference capacity while supplying consumed power of the load 201 from the fuel cell stack 3.

This is different from the art of Published Japanese Translation for PCT International Publication No. 2006-501798 described earlier where a fuel cell generates power at a constant current or at a constant voltage to thereby keep a fuel stoichiometric ratio constant. In the fuel cell system of FIG. 1, as given in the steps S9 to S16, the set voltage Vs is actively varied, in other words, the voltage converter 8 varies the output current Iout1 and the output voltage Vout1 to thereby bring the fuel stoichiometric ratio S to the target fuel stoichiometric ratio St and control it constant. This makes it easier to reduce the dispersion of the output voltage of each fuel cell in a fuel cell stack and generate power while keeping a fuel stoichiometric ratio constant.

The target stoichiometric ratio St may be raised if the dispersion of each output voltage of the cells 2-1 to 2-$n$ cannot be sufficiently reduced in the step S7. The rise in the target stoichiometric ratio St facilitates a reduction in the dispersion of each output voltage of the cells 2-1 to 2-$n$.

Moreover, the fuel-supply control portion 101 is not limited to controlling the variation in the total fuel flow rate R according to each condition in the steps S18 to S20. For example, the total fuel flow rate R may be set in the following expression (1).

$$Ra = Rb + \alpha \times (Pt - Ps) \qquad (1);$$

Ra: newly-set total fuel supply R

Rb: present total fuel supply R $\alpha$: constant indicating electric power generated from a unit-quantity fuel in the fuel cell stack Pt: the target power, and Ps: generated power Ps (average value) of the fuel cell stack.

The constant $\alpha$ is equivalent to the reciprocal numbers of the slopes of the graphs shown in FIG. 6. In setting the total fuel flow rate R in the expression (1), if the generated power Ps (average value) does not reach the target power Pt (Ps<Pt), (Pt−Ps) becomes a positive value to thereby increase the total fuel flow rate R (Ra) newly set by the fuel-supply control portion 101 beyond the present total fuel supply R (Rb). On the other hand, if the generated power Ps (average value) exceeds the target power Pt (Ps>Pt), (Pt−Ps) becomes a negative value to thereby decrease the total fuel flow rate R (Ra) newly set by the fuel-supply control portion 101 lower the present total fuel supply R (Rb). This is the same result as the steps S18 to S20.

In sum, a fuel cell system according to an aspect of the present invention comprises: a fuel cell stack including a plurality of fuel cells connected in series; a fuel supply portion supplying a fuel to each fuel cell; a current regulation portion regulating an electric current flowing from the fuel cell stack in such a way that an output voltage of the fuel cell stack is a predetermined set voltage; a voltage detection portion detecting an output voltage of each fuel cell; a fuel-supply control portion regulating a fuel supply to each fuel cell by the fuel supply portion in such a way that the difference decreases between an output voltage of each fuel cell detected by the voltage detection portion; a fuel-stoichiometric ratio detection portion detecting a fuel stoichiometric ratio of the fuel cell stack; and a fuel-stoichiometric ratio control portion regulating the set voltage in such a way that a fuel stoichiometric ratio detected by the fuel-stoichiometric ratio detection portion is a target fuel stoichiometric ratio set in advance.

According to this configuration, the fuel-supply control portion regulates a fuel supply to each fuel cell by the fuel supply portion in such a way that the difference decreases between an output voltage of each fuel cell detected by the voltage detection portion, thereby reducing the dispersion of the output voltage of each fuel cell. Besides, the fuel-stoichiometric ratio control portion regulates the set voltage in such a way that a fuel stoichiometric ratio detected by the fuel-stoichiometric ratio detection portion is a target fuel stoichiometric ratio set in advance. In addition, the current regulation portion regulates an electric current flowing from the fuel cell stack in such a way that an output voltage of the fuel cell stack is a set voltage set by the fuel-stoichiometric ratio control portion. Since the fuel stoichiometric ratio of the fuel cell stack varies according to the output voltage, the output voltage of the fuel cell stack becomes the set voltage to thereby bring the fuel stoichiometric ratio of the fuel cell stack to the fixed target fuel stoichiometric ratio and thus control the fuel stoichiometric ratio constant. This is different from the prior arts where a fuel cell generates power at a constant current or at a constant voltage to thereby keep a fuel stoichiometric ratio constant. The set voltage are varied, in other words, the output current and output voltage of the fuel cell stack are varied to thereby bring the fuel stoichiometric ratio to the target fuel stoichiometric ratio and keep it constant. This makes it easier to reduce the dispersion of the output voltage of each fuel cell in the fuel cell stack, and at the same time, generate power while keeping the fuel stoichiometric ratio constant.

Furthermore, the fuel-supply control portion may regulate a fuel supply to each fuel cell by the fuel supply portion so as to increase a total fuel supply equivalent to the total quantity of a fuel supplied to the fuel cell stack by the fuel supply portion if generated power of the fuel cell stack is below a predetermined target power and so as to decrease the total fuel supply supplied to the fuel cell stack by the fuel supply portion and the difference between an output voltage of each fuel cell detected by the voltage detection portion if generated power of the fuel cell stack is above the target power.

According to this configuration, if generated power of the fuel cell stack is below a predetermined target power, the fuel-supply control portion increases the total fuel supply supplied to the fuel cell stack from the fuel supply portion to thereby raise the generated power closer to the target power. If generated power of the fuel cell stack is above the target power, the fuel-supply control portion decreases the total fuel supply supplied to the fuel cell stack from the fuel supply portion to thereby reduce the generated power closer to the target power. As a result, the total fuel supply is adjusted in such a way that the target power is obtained from the fuel cell stack. Then, the fuel-supply control portion distributes the fuel in the total fuel supply for obtaining the target power to each fuel cell and regulates the fuel supply to each fuel cell by the fuel supply portion so as to decrease the difference between an output voltage of each fuel cell. This makes it possible to reduce the dispersion of the output voltage of each fuel cell in the fuel cell stack while generating power in such a way that the fuel cell stack can obtain the target power.

Moreover, the fuel cell system may further comprise: a storage device storing generated power of the fuel cell stack and supplying electric power to a load; a residual-capacity detection portion detecting a residual capacity of the storage device; and a target-power setting portion increasing the target power if a residual capacity of the storage device detected by the residual-capacity detection portion is below a reference capacity set in advance and decreasing the target power if a residual capacity of the storage device detected by the residual-capacity detection portion is above the reference capacity.

According to this configuration, if a residual capacity of the storage device detected by the residual-capacity detection portion is below the reference capacity, a target-power setting portion increases the target power. Then, the fuel-supply control portion increases the total fuel supply and raises the generated power to thereby approximate the residual capacity of the storage device to the reference capacity. If a residual capacity of the storage device detected by the residual-capacity detection portion is above the reference capacity, the target-power setting portion decreases the target power. Then, the fuel-supply control portion decreases the total fuel supply and lowers the generated power to thereby approximate the residual capacity of the storage device to the reference capacity. The residual capacity of the storage device is kept near the reference capacity. The reference capacity is set to a level at which the storage device can charge and discharge electric power to thereby supply short power from the storage device when consumed power of the load exceeds generated power of the fuel cell stack and store excessive power in the storage device when consumed power of the load does not reach generated power of the fuel cell stack. This makes it possible to absorb variations in the consumed power of the load.

In addition, the target-power setting portion may increase the target power above consumed power of the load if a residual capacity of the storage device detected by the residual-capacity detection portion is below the reference capacity and may decrease the target power below the consumed power of the load if a residual capacity of the storage device detected by the residual-capacity detection portion is above the reference capacity.

In this case, the target-power setting portion increases the target power beyond consumed power of the load if a residual capacity of the storage device detected by the residual-capacity detection portion is below the reference capacity. Hence, the generated power of the fuel cell stack exceeds the consumed power of the load to produce excessive power, thereby charging the storage device with the excessive power more probably so that the residual capacity of the storage device approaches the reference capacity more certainly. On the other hand, if a residual capacity of the storage device detected by the residual-capacity detection portion is above the reference capacity, the target-power setting portion decreases the target power under consumed power of the load. Hence, the generated power of the fuel cell stack goes down under the consumed power of the load to cause a power shortage, thereby discharging the storage device more probably so that the residual capacity of the storage device approaches the reference capacity more certainly.

Furthermore, the fuel-supply control portion may regulate a fuel supply to each fuel cell by the fuel supply portion in such a way that the difference decreases between an output voltage of each fuel cell detected by the voltage detection portion while updating the total fuel supply in the following expression (1).

$$Ra = Rb + \alpha \times (Pt - Ps) \quad (1);$$

Ra: newly-set total fuel supply
Rb: present total fuel supply
α: constant indicating electric power generated from a unit-quantity fuel in the fuel cell stack
Pt: the target power, and
Ps: generated power of the fuel cell stack.

According to this configuration, if generated power of the fuel cell stack is below the target power, the new total fuel supply increases based on the following expression (1). If generated power of the fuel cell stack is above the target power, the new total fuel supply decreases to thereby reduce the generated power.

Moreover, the fuel-supply control portion may adopt an average value for a predetermined first set time as the generated power of the fuel cell stack.

This configuration lowers the possibility that some temporary variation in the generated power may change the total fuel supply excessively.

In addition, the fuel-stoichiometric ratio control portion may lower the set voltage if a fuel stoichiometric ratio detected by the fuel-stoichiometric ratio detection portion is above the target fuel stoichiometric ratio and may heighten the set voltage if a fuel stoichiometric ratio detected by the fuel-stoichiometric ratio detection portion is below the target fuel stoichiometric ratio.

According to this configuration, the fuel-stoichiometric ratio control portion lowers the set voltage if a fuel stoichiometric ratio detected by the fuel-stoichiometric ratio detection portion is above the target fuel stoichiometric ratio. Therefore, the current regulation portion regulates an electric current flowing from the fuel cell stack to thereby drop the output voltage of the fuel cell stack. This reduces the fuel stoichiometric ratio of the fuel cell stack toward the target fuel stoichiometric ratio. On the other hand, if a fuel stoichiometric ratio detected by the fuel-stoichiometric ratio detection portion is below the target fuel stoichiometric ratio, the fuel-stoichiometric ratio control portion raises the set voltage. Therefore, the current regulation portion regulates an electric current flowing from the fuel cell stack to thereby raise the output voltage of the fuel cell stack. This increases the fuel stoichiometric ratio of the fuel cell stack toward the target fuel stoichiometric ratio.

Furthermore, a current detection portion may be further provided which detects an electric current flowing from the fuel cell stack; and the fuel-stoichiometric ratio detection portion may calculate a fuel stoichiometric ratio S of the fuel cell stack using an electric current I (A) detected by the current detection portion in the following expression (2).

$$\text{Fuel stoichiometric ratio } S = \{n \times M \times R \times F/(60 \times 10^3)\}/I \quad (2);$$

n: charge number of a fuel oxidization reaction
M: fuel concentration (mol/L)
R: fuel flow rate average value (cc/min) supplied to each fuel cell, and
F: Faraday constant (=96485 C/mol)

According to this configuration, the fuel-stoichiometric ratio detection portion can calculate the fuel stoichiometric ratio S of the fuel cell stack using the electric current I (A) detected by the current detection portion in the following expression (2). This makes it easier to calculate a fuel stoichiometric ratio equal to a value obtained by dividing a fuel supply to the fuel cell stack by a power-generating fuel flow-rate, as compared with actually measuring and calculating a power-generating fuel flow rate.

Moreover, the fuel-stoichiometric ratio detection portion may adopt an average value for a predetermined second set time of an electric current detected by the current detection portion as the electric current I.

This configuration lowers the possibility that some temporary variation in the electric current flowing from the fuel cell stack may change the fuel stoichiometric ratio excessively.

In addition, the target fuel stoichiometric ratio may be set as $1/\eta + E$ and E may be 0.01 to 0.2;
E: stoichiometric number for an electric current according to a discharged-fuel quantity from an electrode of each fuel cell, and
η: fuel utilization equivalent to the ratio of a power-generating fuel to a fuel quantity consumed by the fuel cell stack.

The inventors found out that this configuration realizes an excellent power-generation efficiency.

Furthermore, the target fuel stoichiometric ratio may be 1.01 to 1.6.

This configuration facilitates an improvement in power-generation efficiency simply by setting the above E to 0.01 to 0.2.

As described so far, the fuel cell system according to an aspect of the present invention is suitably employed as a power source for an electronic apparatus such as a notebook personal computer, a digital camera and a cellular phone, a battery drive apparatus in a vehicle such as an electric car and a hybrid car, and another such battery drive apparatus.

This application is based on Japanese patent application serial No. 2007-155608 filed on Jun. 12, 2007 and No. 2008-136265 filed on May 26, 2008, in Japan Patent Office, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A fuel cell system, comprising:
a fuel cell stack that is configured to include a plurality of fuel cells which are connected in series;
a fuel supply portion that is configured to supply a fuel to each of the fuel cells;
a current regulation portion that is configured to regulate an electric current flowing from the cell stack in such a way that an output voltage of the fuel stack is a predetermined set voltage;

a voltage detection portion that is configured to detect output voltages of each of the fuel cells;

a fuel-supply control portion that is configured to regulate a fuel supply to each fuel cell by the fuel supply portion so as to decrease a difference between the output voltages of each of the fuel cells detected by the voltage detection portion;

a fuel-stoichiometric ratio detection portion that is configured to detect a fuel stoichiometric ratio of the fuel cell stack, the fuel stoichiometric ratio equaling supplied-fuel consuming rate/power-generating fuel consuming rate; and a fuel-stoichiometric ratio control portion that is configured to regulate the set voltage in such a way that the fuel stoichiometric ratio detected by the fuel-stoichiometric ratio detection portion is target fuel stoichiometric ratio set in advance, wherein the fuel-stoichiometric ratio control portion is configured to lower the set voltage if a fuel stoichiometric ratio detected by the fuel-stoichiometric ratio detection portion is above the target fuel stoichiometric ratio and is configured to heighten the set voltage if a fuel stoichiometric ratio detected by the fuel-stoichiometric ratio detection portion is below the target fuel stoichiometric ratio.

2. The fuel cell system according to claim 1, wherein the fuel-supply control portion regulates a fuel supply to each fuel cell by the fuel supply portion so as to increase a total fuel supply equivalent to the total quantity of a fuel supplied to the fuel cell stack by the fuel supply portion if generated power of the fuel cell stack is below a predetermined target power and so as to decrease the total fuel supply supplied to the fuel cell stack by the fuel supply portion and the difference between an output voltage of each fuel cell detected by the voltage detection portion if generated power of the fuel cell stack is above the target power.

3. The fuel cell system according to claim 2, further comprising:

a storage device storing generated power of the fuel cell stack and supplying electric power to a load;

a residual-capacity detection portion detecting a residual capacity of the storage device; and a target-power setting portion increasing the target power if a residual capacity of the storage device detected by the residual-capacity detection portion is below a reference capacity set in advance and decreasing the target power if a residual capacity of the storage device detected by the residual-capacity detection portion is above the reference capacity.

4. The fuel cell system according to claim 3, wherein the target-power setting portion increases the target power above consumed power of the load if a residual capacity of the storage device detected by the residual-capacity detection portion is below the reference capacity and decreases the target power below the consumed power of the load if a residual capacity of the storage device detected by the residual-capacity detection portion is above the reference capacity.

5. The fuel cell system according to claim 2, wherein the fuel-supply control portion regulates a fuel supply to each fuel cell by the fuel supply portion in such a way that the difference decreases between an output voltage of each fuel cell detected by the voltage detection portion while updating the total fuel supply in the following expression (1):

$$Ra = Rb + \alpha \times (Pt - Ps) \quad (1);$$

Ra: newly-set total fuel supply
Rb: present total fuel supply
α: constant indicating electric power generated from a unit-quantity fuel in the fuel cell stack
Pt: the target power and
Ps: generated power of the fuel cell stack.

6. The fuel cell system according to claim 2, wherein the fuel-supply control portion adopts an average value for a predetermined first set time as the generated power of the fuel cell stack.

7. The fuel cell system according to claim 1, wherein:

a current detection portion is further provided which detects an electric current flowing from the fuel cell stack; and the fuel-stoichiometric ratio detection portion calculates a fuel stoichiometric ratio S of the fuel cell stack using an electric current I (A) detected by the current detection portion in the following expression (2):

$$\text{Fuel stoichiometric ratio } S = \{n \times M \times R \times F/(60 \times 10^3)\}/I \quad (2);$$

n: charge number of a fuel oxidization reaction
M: fuel concentration (mol/L)
R: fuel flow rate average value (cc/min) supplied to each fuel cell and
F: Faraday constant (=96485C/mol).

8. The fuel cell system according to claim 7, wherein the fuel-stoichiometric ratio detection portion adopts an average value for a predetermined second set time of an electric current detected by the current detection portion as the electric current I.

9. The fuel cell system according to claim 1, wherein the target fuel stoichiometric ratio is set as $1/\eta + E$ and E is 0.01 to 0.2;

E: stoichiometric number for an electric current according to a discharged-fuel quantity from an electrode of each fuel cell and
η: fuel utilization equivalent to the ratio of a power-generating fuel to a fuel quantity consumed by the fuel cell stack.

10. The fuel cell system according to claim 1, wherein the target fuel stoichiometric ratio is 1.01 to 1.6.

11. The fuel cell system according to claim 1, wherein:

the fuel-supply control portion regulates a fuel supply to each fuel cell by the fuel supply portion so as to increase a total fuel supply equivalent to the total quantity of a fuel supplied to the fuel cell stack by the fuel supply portion if generated power of the fuel cell stack is below a predetermined target power and so as to decrease the total fuel supply supplied to the fuel cell stack by the fuel supply portion and the difference between an output voltage of each fuel cell detected by the voltage detection portion if generated power of the fuel cell stack is above the target power;

the fuel cell system further comprises a storage device storing generated power of the fuel cell stack and supplying electric power to a load, a residual-capacity detection portion detecting a residual capacity of the storage device, and a target-power setting portion increasing the target power if a residual capacity of the storage device detected by the residual-capacity detection portion is below a reference capacity set in advance and decreasing the target power if a residual capacity of the storage device detected by the residual-capacity detection portion is above the reference capacity; and the fuel-stoichiometric ratio control portion lowers the set voltage if a fuel stoichiometric ratio detected by the fuel-stoichiometric ratio detection portion is above the target fuel stoichiometric ratio and heightens the set voltage if a fuel stoichiometric ratio detected by the fuel-stoichiometric ratio detection portion is below the target fuel stoichiometric ratio.

* * * * *